Feb. 13, 1968    C. E. ARNOLD ET AL    3,369,153
DEVICE FOR PROTECTING ELECTRICAL APPARATUS
Filed Jan. 28, 1966
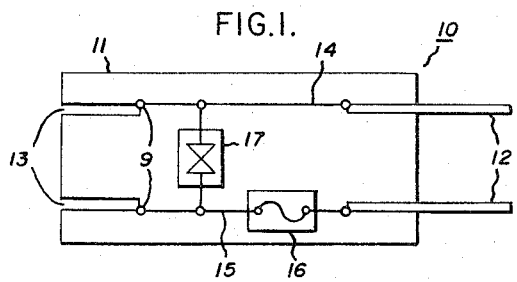
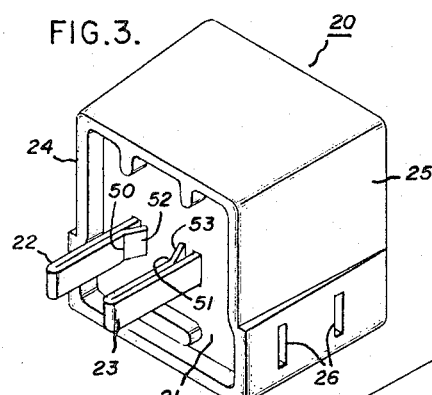
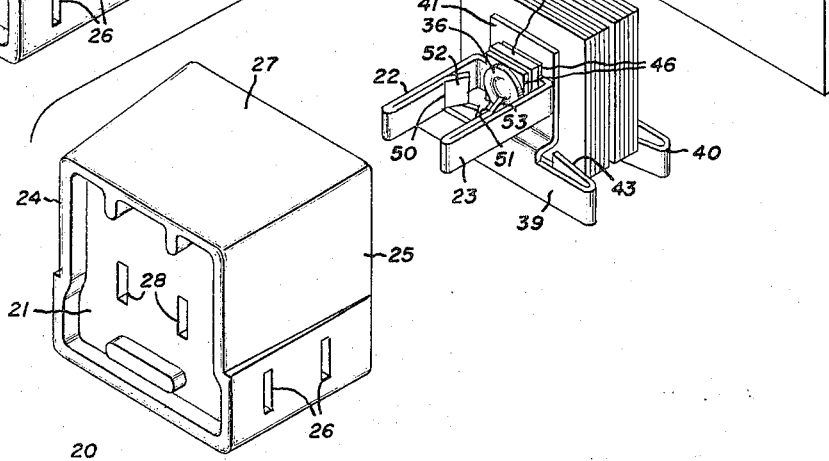
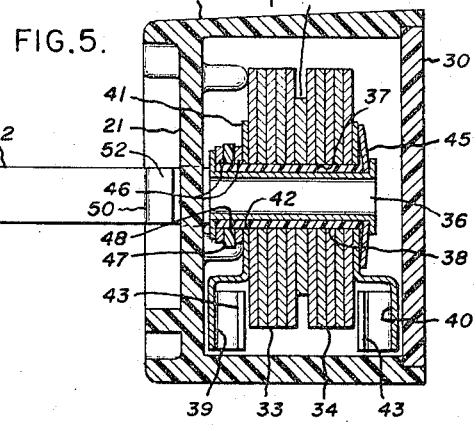
INVENTORS:
CHARLES E. ARNOLD,
LEONARD G. SAYER,
BY *Urban H. Faulkner*
THEIR ATTORNEY.

United States Patent Office 3,369,153
Patented Feb. 13, 1968

3,369,153
DEVICE FOR PROTECTING ELECTRICAL
APPARATUS
Charles E. Arnold and Leonard G. Sayer, Lynchburg, Va., assignors to General Electric Company, a corporation of New York
Filed Jan. 28, 1966, Ser. No. 523,611
2 Claims. (Cl. 317—16)

This invention relates to protective apparatus for electrical equipment and appliances and is particularly useful in the protection of voltage sensitive appliances from line voltage surges in homes.

Fields tests have shown that transient overvoltages frequently occur in apartment buildings and homes. It is not uncommon for overvoltages of 1200 to 2000 volts to occur with the duration of the major oscillation of between 1 and 4 microseconds. Since the surge impedance of a house wiring cable is found to be in the 10 to 100-ohm range, for short pulses, currents as high as 200 amperes may easily be involved. The cause of such transient voltages is usually unknown. However, they may be caused by lightning, faults or dropping or adding electrical loads. Regardless of the source, however, transient overvoltages represent a source of danger to electrical equipment and particularly, electrical equipment which employ sensitive semiconductors, e.g., a home television set.

There are a number of ways to eliminate or reduce the effect of the transients in a protected area. For example, devices may be used in the equipments which have high enough individual peak reverse voltage ratings to cope with the overvoltages over the period of time in question. Further, relays, switches, gaps, fuses, etc. which operate either to short circuit the transient upon appearance of an overvoltage or to open the circuit upon the appearance of an overvoltage may be employed. Among the devices which operate to short circuit the transient are non-linear resistors and semiconductor components such as zener diodes, controlled avalance rectifiers and selenium rectifiers. In a preferred solution these devices are connected in a protective circuit across the line so that upon the occurrence of a transient, the device breaks down at some voltage above the normal rated line voltage and the circuit absorbs the peak current surge and, preferably provides an essentially constant voltage across the line. The problem and the solutions suggested here are discussed in the General Electric Application Note 200.5 by Charles E. Arnold and Gerald H. Bacon entitled "General Electric Selenium Thyrector Diodes Transient Voltage Suppressors."

Thus, it is seen that neither the problem nor solutions to the problem are new and a few of the characteristics of the solution to be considered in selecting a method to suppress transient voltages are cost, time of response, power capability, frequency of response, and size. Solutions are most frequently designed for the particular application. Unfortunately, a simple inexpensive means of protecting appliances in the home from transients has not been available. That is, the devices discussed above have been available but are not generally in a form which can easily be applied in the home by the home owner. Generally, fuses do not protect against the surges of the type discussed here since they do not react fast enough. Some sharp breakdown selenium diodes have been packaged so that they can be placed across a utility circuit by plugging then into an existing outlet. However, this arrangement uses up house outlet space and may be ineffective to protect appliances at remote locations on the circuit.

Accordingly, it is an object of the present invention to provide a simple, relatively inexpensive means for protecting home appliances from surge voltage transients which protective means does not reduce the number of wall outlets available for general use.

In the copending patent application Docket 36–68D–113 filed in the name of Neville Mapham and assigned to the assignee of the present invention, a device for protecting electrical apparatus is provided which may be plugged in an ordinary outlet (e.g., an ordinary home wall socket) and which incorporates a voltage limiting breakdown means in parallel with the circuit to which it is applied and which, at the same time, provides at least one outlet for receiving a male plug. The present invention constitutes an assembly which incorporates the elements above to provide a simple effective and inexpensive protective device.

The novel features which are believed to be characteristic of the invention are set forth with particularity in the appended claims. The invention itself, however, both as to its organization and method of operation, together with further objects and advantages thereof may best be understood by reference to the following description taken in connection with the accompanying drawing in which:

FIGURE 1 is a diagrammatic view illustrating the circuit incorporated in the assembly of the present invention;

FIGURE 2 is a graph showing the general voltage-current characteristic of the type of protective device desirable for use in the circuit illustrated in FIGURE 1 and showing the percent rated peak voltage plotted along the axis of the abscissa and the peak current plotted along the axis of ordinates;

FIGURE 3 is a perspective view of the assembly of the preferred embodiment of the invention;

FIGURE 4 is an exploded perspective view of the embodiment illustrated in FIGURE 3; and FIGURE 5 is a vertical longitudinal section through the device of FIGURES 3 and 4.

Referring specifically to the diagrammatic drawing of FIGURE 1, one particular protective device 10 embodying the circuit employed is illustrated. A plug housing 11 is schematically illustrated as having a pair of male plug terminals 12 which are intended to be inserted in an ordinary outlet and a pair of apertures 13 at the opposite end which are intended to receive the male terminals from an electrical plug such as the plug of an electrical cord on an appliance. The apertures 13 terminate in the female terminals 9. In order to provide a direct electrical connection between female and male terminals 9 and 13 respectively, an electrical connection 14 is provided between the upper (in the drawing) male terminal 12 and the upper female terminal 9 and a like connection 15 is provided between the lower male and female terminals 12 and 9 respectively. As an additional safety factor, the lower electrical connection 15 is provided with an ordinary fuse 16 in series. The fuse 16 is in no way necessary in the protective device and is intended to be one which melts or is severed by a continued overcurrent through the lead 15. In fact, the fuse is not incorporated in the circuit of the preferred embodiment of FIGURES 3, 4 and 5.

In order to provide the transient suppression and thus protect an electrical appliance which is plugged into the protective plug 10 from line surges, a protective device 17 is connected directly between the upper and lower electrical connectors 14 and 15. This connection places the transient suppressor directly across the line which supplies any appliance which is utilized with the protective plug 10. For purposes of this application, devices having such a sharp breakdown voltage current characteristics are defined as sharp breakdown devices. The protective device 17 may be of a variety of types but preferably has the voltage current characteristic illustrated in FIGURE 2, that is, the device should, for voltage of either polarity thereacross, have a sharp breakdown characteristic when a voltage of something over the normal peak rated voltage (e.g., 150 to 200%) appears thereacross.

The characteristic illustrated is that of a selenium diode known commercially as the Thyrector diode manufactured by the General Electric Company. As is seen, current does not flow through the device until about 100% of rate voltage is applied thereacross at which time the current increases rapidly and the voltage across the device is limited to something a little over 200% of the peak rated voltage. By connecting two such stacks face to face, or in opposite polarity between the two electrical leads 14 and 15, the breakdown voltage current characteristic of the device 17 is made symmetrical for voltages across the device of either polarity. Thus, the total voltage across any appliance plugged into the protective plug 10 is limited to some value which is safe.

The protective device 17 may, in fact, be any other device with sharp breakdown characteristics as shown (i.e., sharp breakdown devices). For example, Zener diodes connected back to back, controlled avalanche rectifiers with a back to back connection or certain iron-linear resistors may be used. However, the most successful diode found so far in this application and the one employed in the preferred embodiment is the specially manufactured sharp breakdown selenium rectifier known as the Thyrector diode.

A preferred embodiment of the invention is illustrated in FIGURES 3, 4 and 5. The arrangement of the assembled parts form the present invention. As is seen in FIGURE 3, the protective device is comprised of a housing 20 which is essentially box shaped, that is, it has six essentially rectangular sides. So that the housing may be plugged into an ordinary wall outlet, two male conductive terminals 22 and 23 which protrude from the back face 21 are provided. Two opposite side walls 24 and 25 of the housing (walls which are perpendicular to the back face) are each provided with a pair of apertures 26 which are designed to receive male terminals from an electrical plug.

The full assembly may best be seen by reference to FIGURE 4. As illustrated, the housing 20 is composed of two parts: the rectangular box-like back portion 27 which includes four side walls including side walls 24 and 25 with their apertures 26 for reception of male terminals from electrical plugs and the back wall 21 with apertures 28 for egress of the device male terminals 22 and 23. The front of the box-like housing 20 is composed of an essentially rectangular closure 30 which snaps into the opening in the front of the box-like back portion 27 and forms the closure for the protective assembly which is held inside. Both the front closure 30 and the back face 21 of the box-like back portion 27 are provided with inwardly extending protrusions which protrusions are provided to hold the internal assembly in place so that it does not move around within the box-like enclosure 20 when it is closed.

The heart of the assembly consists of two separate stacks of selenium rectifier plates 33 and 34. As shown here, the plates are selenium and the plates of each stack all are of one polarity but the two stacks are placed in reverse polarity (essentially face-to-face) so that they conduct in opposite directions (toward each other). This provides the symmetrical reverse breakdown characteristics shown in FIGURE 2. An annular spacer washer 35 is provided between the two stacks primarily to give the combination of the two stacks 33 and 34 the proper thickness when the stacks are assembled. As will be seen later, the desired thickness for this assembly of stacks is such that the male terminals of an electric plug will just fit outside the opposite end plates of the two stacks in a conducting and engaging contact. Each of the plates in the stacks 33 and 34 is provided with a centrally located aperture 37 for purposes of mounting.

In order to provide a mounting means for the total assembly, a conductive lead through 36 which is as illustrated a simple copper tube is provided. An insulating tube 38 is provided around the conductive lead through 36 so that contact is not made with the individual plates of the stacks 33 and 34 when the lead through is inserted in the apertures 37. The stacks are mounted on the lead through around the insulating tube 38 in face-to-face relation as previously described.

In order to provide receptacles for male plugs, a pair of essentially T-shaped female terminals 39 and 40 are provided. Each of the essentially T-shaped terminals has an upright tab which is provided with an aperture 42 for the purpose of permitting it to be placed on the insulating member 38 around the lead through 36. The opposite ends 43 of the cross members of the T are folded back upon the cross member of the T to form spring members and the upright 41 of the T has an offset so that the folded back spring-like ends 43 of the female terminals 39 and 40 fit between the cross members and the outer plate of the adjacent stack when the tabs are secured on the cross members. Thus, when the tabs 41 are secured on the cross members with the stacks 33 and 34 the terminals of a male plug will slide just outside the outer plates of the assembled stacks and just inside the spring-like end members 43 on the female terminals 39 and 40. The cross member on the female terminals 40 extend in opposite directions to provide for receptacles for male plugs on opposite sides of the stack. As illustrated, once the tabs of the female contacts 39 and 40 are placed on the lead through adjacent the stacks, an annular holding washer 45 is placed over the lead through adjacent terminal 40 at one end (left side in the drawing) and the tube-like lead through 36 is peened over to hold the holding washer 45 and female contact 40 against the outer plate of the stack 34. The lead through 36 makes electrical contact with the washer 45, the female terminal 40 adjacent it and the outer plate of stack 33. At the opposite end of the two rectifier stacks, that is at the outer plate of rectifier stack 33, the tab of the other female terminal 39 contacts the outer plate of that stack but is insulated from the lead through.

The male terminals 22 and 23 are conductive L-shaped members each of which has an aperture in the foot member 46 or tab of the L. In order to provide a means to hold the assembly in the housing, the upright portion 50 and 51 of the L-shaped male terminals 22 and 23 respectively are folded back and provided with protruding snap spring ends 52 and 53. To complete the parts of the assembly and to insulate one male terminal from the other, an insulating washer 47 is provided between the two foot portions of the two terminals 22 and 23. The insulating washer 47 is provided with a centrally located aperture 48 so that the foot portions of the two male terminals and the washer 47 may be positioned around the lead through 36 and insulating member 38. In the assembly the foot portion of male terminal 23 fits flush against the tab 41 of the adjacent female terminal 39 and thus contacts both that terminal and the next adjacent end plate of stack 33 but is insulated from the lead through 36. With the two male terminals in this position, the end of the lead through 36 is peened over to hold the entire assembly together and to contact the L-shaped male terminal 22.

The entire assembly is positioned in the back portion of the housing 20 with the male terminals 22 and 23 protruding through the apertures 28 in the back. The snap spring ends 52 and 53 of the male terminals 22 and 23 are pressed through the apertures 28 and snap against the back 52 of the housing, thus holding the assembly in place. The cross member of the T-shaped female terminal 39 fits under the protrusion 32 on back wall 21. The stacks 33 and 34 fit just between the apertures 26 in the side walls 24 and 25 of the housing. Thus, when the male terminals of a plug are inserted in the apertures 26 in the side walls, they fit on opposite sides of the end plates of the stacks 33 and 34 and inside the folded back spring-like ends 43 of the female terminals 39 and 40. The box-like housing 20 is then closed by placement of the front wall 30 over the opening in the box-like back portion 27. In the embodiment illustrated, the cover 30 snaps into place on the box 20 but it may be fixed in place by any appropriate means.

The circuit of this assembly may be compared to that of FIGURE 1 omitting the fuse 16 in FIGURE 1. The male terminal 23 is connected directly to the female terminal 39 and the male terminal 22 is connected by means of the lead through 36 directly to the opposite female terminal. This compares with the direct electrical connection between male terminals 12 and female terminals 13 in the circuit of FIGURE 1. Further, each of the female terminals 39 and 40 (FIGURES 3, 4 and 5) is connected directly to an end plate of the oppositely poled stacks 33 and 34 just as the female terminals 13 are connected to opposite ends of the protective device in FIGURE 1. Thus, the stacks 33 and 34 are connected in parallel with the electrical circuit of an appliance connected with its plug inserted in the apertures 26. Since the stacks 33 and 34 have characteristics as illustrated in FIGURE 2, any electrical apparatus so connected will have the surge protection provided by the stacks. Actually, the stacks also provide protection for devices connected to the same electrical circuit.

While a particular embodiment of the invention has been shown, it will, of course, be understood that the invention is not limited thereto since many modifications both in the circuit arrangement and in the instrumentalities employed may be made. It is contemplated that the appended claims cover any such modifications as fall within the true spirit and scope of the invention.

What we claim as new and desire to secure by Letters Patent of the United States is:

1. A device for protecting electrical apparatus including in combination, housing means and a rectifier and contact assembly contained within said housing; said housing comprising a box-like structure provided with at least a pair of male terminal apertures for egress of device terminals and at least a pair of female terminal apertures for ingress of male terminals from an electrical plug; said rectifier and contact assembly including a first and a second series of rectifier plates with apertures therethrough, each series stacked together in conducting relationship with individual plates in each series having the same forward conducting direction, a conducting supporting lead through, insulating means surrounding said lead through said lead through and insulating means extending through the apertures in said first and second series of rectifier plates and supporting them in face-to-face relation with opposite polarity, a pair of metal spring contact receiving terminals each having a tab with an aperture therethrough and an extending spring portion, said metal spring contact receiving terminals located with said tabs on said lead through and on opposite sides of said first and second series of plates with said tabs each in conductive contact with an opposite end plate of a respective one of said first and second series of plates and said metal spring contact receiving terminals extending from said lead through and forming spring members opposing the adjacent end plate each for receiving and frictionally engaging a male terminal, and a pair of essentially L-shaped male terminals each having an aperture through the foot of the L, said pair of essentially L-shaped male terminals each located with the aperture in said feet around said lead through and extending outwardly to form a pair of essentially parallel device male terminals, said feet being insulated from each other, said lead through being electrically connected to one of said L-shaped male terminals and the end plate of one of said series and the other L-shaped terminal electrically connected to the other end plate whereby each of said L-shaped male terminals is electrically connected to a respective one of said spring contact receiving terminals and both said series of rectifier plates are connected in series opposed relation between said terminals, said rectifier and contact assembly contained within said housing with said female receptacles in alignment with the apertures in said housing for ingress of male terminals from an electrical plug and said male terminals of said assembly protruding through said housing apertures for egress of male terminals.

2. A device for protecting electrical apparatus as defined in claim 1 wherein said housing is provided with two pairs of female terminal apertures on opposite sides for ingress of male terminals from adjacent electrical plugs and said pair of metal spring contact receiving terminals each comprises an essentially T-shaped member with the upright of each T-forming a tab and each end of the cross bar constituting a contact receiving terminal for a male terminal from different electrical plugs whereby placement of said T-shaped terminals relative to said rectifier and contact assembly and housing as defined in claim 1 provides receiving contacts for the terminals for a pair of male plugs in alignment with the two pairs of female apertures in said housing.

References Cited
UNITED STATES PATENTS

| 3,047,773 | 7/1962 | Morton | 307—146 X |
|---|---|---|---|
| 3,129,341 | 4/1964 | Rockafellow | 307—88.5 |
| 3,323,017 | 5/1967 | Powell et al. | 317—31 X |

OTHER REFERENCES

Silicon Zener Diode and Rectifier Handbook, Second Edition, Motorola, Inc., 1961, pp. 69 and 75.

MILTON O. HIRSHFIELD, *Primary Examiner.*

J. D. TRAMMELL, *Assistant Examiner.*